US 6,677,570 B1

(12) United States Patent
Kogan et al.

(10) Patent No.: US 6,677,570 B1
(45) Date of Patent: Jan. 13, 2004

(54) WIDE DYNAMIC RANGE OPTICAL POWER DETECTOR

(75) Inventors: Yakov Kogan, Wayland, MA (US); Donald McDaniel, North Andover, MA (US); Reich Watterson, Lexington, MA (US)

(73) Assignee: Nortel Networks Limited, St. Laurent (CA)

( * ) Notice: Subject to any disclaimer, the term of this patent is extended or adjusted under 35 U.S.C. 154(b) by 78 days.

(21) Appl. No.: 09/847,506

(22) Filed: May 2, 2001

Related U.S. Application Data

(60) Provisional application No. 60/234,660, filed on Sep. 22, 2000.

(51) Int. Cl.[7] .................................................. H01J 40/14
(52) U.S. Cl. ................................ 250/214 A; 250/214 L; 250/238
(58) Field of Search ........................ 250/214 L, 214 A, 250/238; 257/930, 712; 219/497, 502; 327/83, 512–513

(56) References Cited

U.S. PATENT DOCUMENTS

| | | | | | |
|---|---|---|---|---|---|
| 4,933,543 | A | * | 6/1990 | Hull | 250/214 C |
| 5,023,445 | A | * | 6/1991 | Goll et al. | 250/227.15 |
| 5,900,649 | A | * | 5/1999 | Effelsberg | 257/81 |
| 6,437,320 | B1 | * | 8/2002 | Yoshida et al. | 250/214 A |
| 2001/0032921 | A1 | * | 10/2001 | Forsberg | 250/214.1 |

* cited by examiner

*Primary Examiner*—David Porta
*Assistant Examiner*—Stephen Yam
(74) *Attorney, Agent, or Firm*—Guerin & Rodriguez, LLP; Michael A. Rodriguez

(57) ABSTRACT

According to an aspect of the present invention, a power detector including a photodiode and a logarithmic transimpedance amplifier is mounted inside a hermetically sealed package in such a way that the photodiode and the logarithmic transimpedance amplifier are located on the same thermally conductive substrate.

18 Claims, 5 Drawing Sheets

WIDE DYNAMIC RANGE OPTICAL POWER DETECTOR

This non-provisional patent application claims the benefit of U.S. Provisional Application No. 60/234,660 filed on Sep. 22, 2000 titled "Wide Dynamic Range Photo Detector" by inventors Yakov Kogan, Donald McDaniel and Reich Watterson.

BACKGROUND OF THE INVENTION

A high level of reliability and the ability to quickly diagnose a hardware problem are decisive factors in the successful operation of fiberoptic networks. The measurement of optical power, in the fiber is used to maintain and troubleshoot the network. The complex and flexible architectures of WDM networks generate a wide variety of signal combinations in the same fiber. To characterise the behaviour of such networks, an optical power detector is typically utilized having a wide dynamic range. To perform a measurement, a fraction of light energy from the fiber is coupled into the detector. By keeping the amount of diverted light small, signal losses are reduced. Therefore, it is advantageous to use a detector that is sensitive to low-level signals. Optical power detectors usually include photodiodes, in combination with transimpedance amplifiers. They transform the optical power into an analog voltage signal.

To increase the dynamic range of these detectors, logarithmic transimpedance amplifiers with a p-n junction can be used. However, photodiodes with logarithmic transimpedance amplifiers are typically not widely used due to several significant disadvantages. One such disadvantage is the limitation of sensitivity of the detector to low optical power due to the influence of the dark current of the photodiode. The dark current is highly temperature dependant and, thus, difficult to correct for with temperature variations. Additionally, the leakage current through the detector is temperature and humidity dependant and its influence also limits the sensitivity of the detector. Lastly, the logarithmic transform characteristic of the amplifier is temperature dependant because of the physics of the p-n junction. Accordingly, as temperature varies, the above mentioned phenomena contribute to the limitation of the detector.

Another significant limitation of logarithmic transimpedance amplifiers is limited frequency response. The cause of it is a combination of a very high equivalent dynamic resistance of the p-n junction at the bottom of the dynamic range of the amplifier, capacitance of the junction and stray capacitance of the circuit board.

SUMMARY OF THE INVENTION

In accordance with an aspect of the present invention, an apparatus for a wide dynamic range photodetector is provided. According to an aspect of the present invention, an optical power detector including a photodiode and a logarithmic transimpedance amplifier is mounted inside a hermetically sealed package in such a way that the photodiode and the logarithmic transimpedance amplifier are located on the same thermally conductive substrate. A control apparatus, such as a thermal electric cooler, thermistor and electronic control circuit, maintains the constant temperature of the substrate and components mounted thereon. A benefit of the present invention is that stabilization of photodiode dark current, logarithmic transimpedance amplifier transfer characteristics, and circuit leakage currents, are thereby achieved.

The second benefit of the invention is that due to the use of hybrid microelectronic assembly technology inside the package the stray capacitance is kept down providing higher frequency response.

In a further aspect of the present invention, a wide dynamic range optical power detector is described that includes a photodiode for receiving an optical signal, a logarithmic transimpedance amplifier with a p-n junction device as a logarithmic element, coupled to the photoidiode and a thermally conductive substrate having the above mentioned devices mounted thereon such that they are maintained at essentially the same constant temperature independent of the environment temperature.

More specifically, the optical power detector includes a thermal electric cooler and a temperature measurement device, both coupled to the substrate, and a temperature control circuit, coupled to the temperature measurement device. The temperature control circuit receives temperature measurements of the substrate and responsively sends controlling signals to the thermal electric cooler in order to maintain a constant temperature.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DESCRIPTION OF A PREFERRED EMBODIMENT

Figure 1:
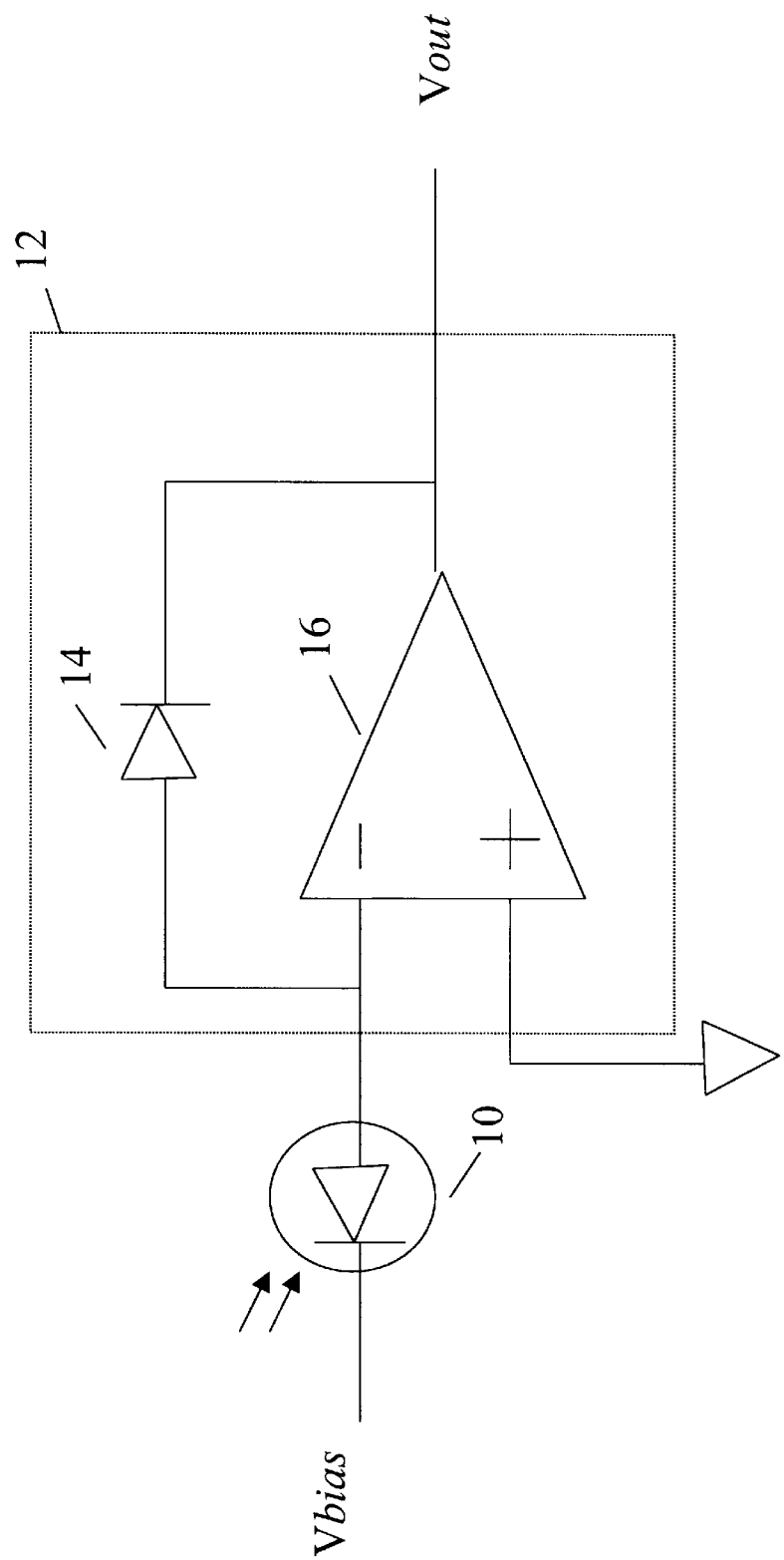
FIG. 1 depicts a circuit diagram of a photodetector and logarithmic transimpedance amplifier.

Referring now to FIG. 1, a circuit layout of a photodetector 10 coupled to a logarithmic transimpedance amplifier 12 is shown. The logarithmic transimpedance amplifier 12 includes a p-n junction device 14 that is placed in the feedback circuit of an operational amplifier 16. When an optical signal is imposed on photodetector 10, a corresponding electrical signal is output to operational amplifier 16. P-N junction device 14 causes that amplification of that signal to be logarithmic, in other words as the optical power increases, the magnitude of the electrical signal is increased logarithmically. The output voltage of the logarithmic transimpedance amplifier shown on FIG. 1 can be calculated using formula 1 below, where k is Boltzmann's constant, q is Electron charge, T is absolute temperature of the p-n junction device 14 in Kelvin, r is the responsivity of the photodiode, W is detected optical power and $I_s$ is the reverse saturation current of the P-N junction device:

$$Vout = \frac{k \cdot T}{q} \cdot \ln\left(\frac{r \cdot W}{Is}\right) \qquad \text{Formula 1}$$

Figure 2:
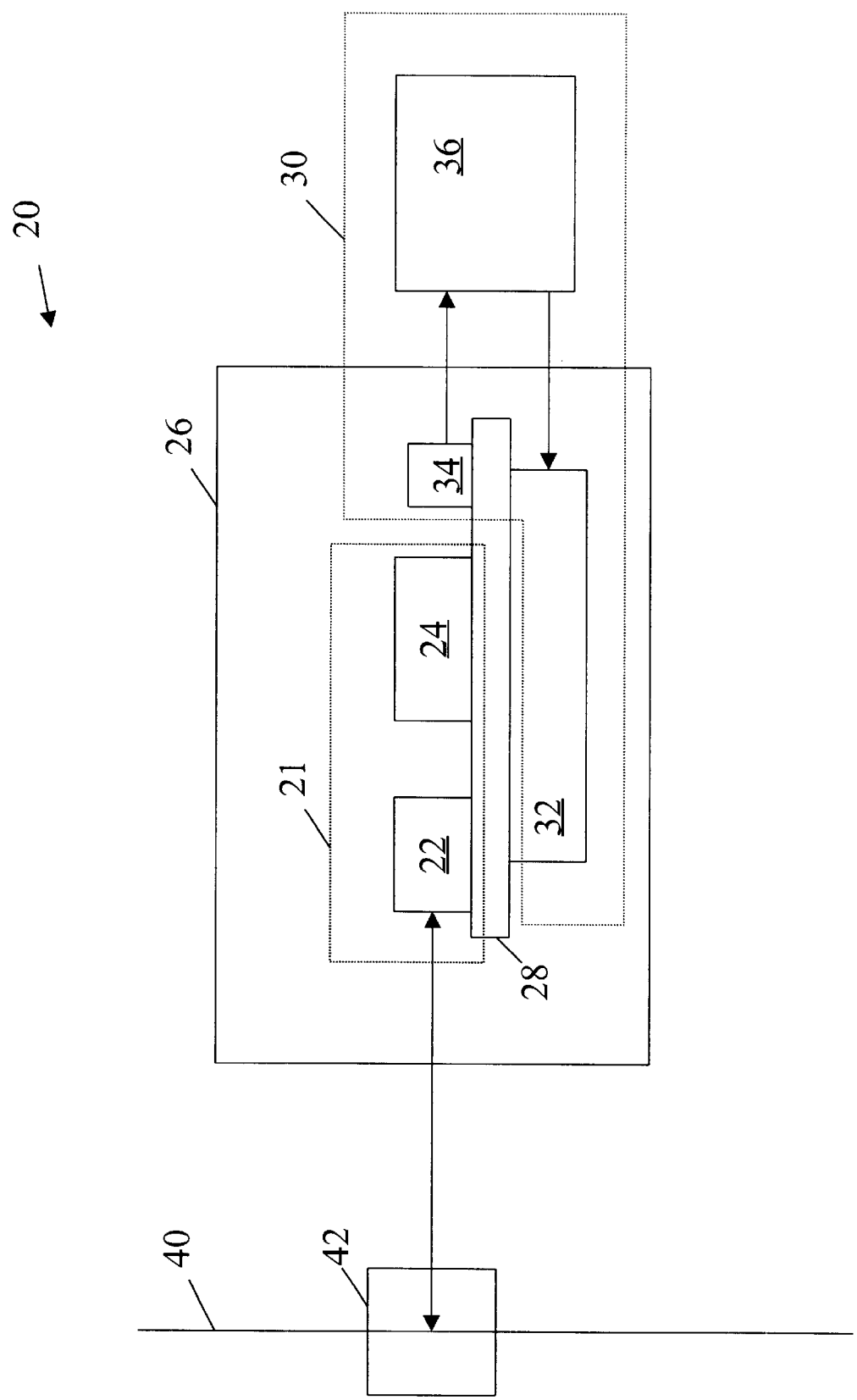
FIG. 2 depicts an optical power detector including the components of FIG. 1 mounted on a temperature controlled substrate according to the present invention.

Accordingly, the transfer characteristic of the circuit is directly proportional to the absolute temperature of the p-n 14 junction. It also depends on the reverse saturation current of the p-n junction, which is also temperature dependent. FIG. 2 shows an exemplary optical power detector construction 20. A portion of light energy from an optical network fiber 40 is coupled by an optical coupler 42 into the optical power detector 21. The power detector 21 (including a photodiode 22 and a logarithmic transimpedance amplifier 24) is mounted inside a hermetically sealed package 26 in such a manner that the photodiode 22 and the logarithmic transimpedance amplifier 24 are located on the same thermally conductive substrate 28. Substrate 28 contains conductors that along with electronic components mounted on it form the photodetector circuit. A control unit 30 includes the thermal electric cooler 32, thermistor 34 and electronic temperature control circuit 36. The control unit 30 maintains the substrate 28 and components mounted thereon, at a relatively constant temperature.

Stabilization of the photodiode dark current, the logarithmic amplifier transfer characteristics and the circuit leakage currents is achieved by maintaining the components in the hermetic package 26 at a constant temperature. Therefore, non-linearity of the photodetector transfer characteristic at low input power levels, caused by the influence of the photodiode dark current and electronic circuit leakage current, becomes stable and insensitive to the environmental conditions due to the fact that the temperature of the detector package is held constant. Further, the photodetector transfer characteristic instability, caused by thermal dependency of the p-n junction, is removed.

Non-linearity of the photodetector is quantified and corrected by linearization to achieve a linear detector input optical power to output voltage transfer characteristic at lower input optical power levels and to obtain a higher linear dynamic range.

Placing the circuit in the sealed package allows the size of the circuit to be reduced by using bare die electronic components. That ensures a high frequency response of the circuit at the low end of the dynamic range because it reduces the internal capacitance of the p-n junction device in the detector feedback loop along with reducing the stray capacitance of the circuit around it. To further increase the frequency response of the circuit and improve thermal stability the circuit can be put on a single microelectronic chip.

Figure 3:
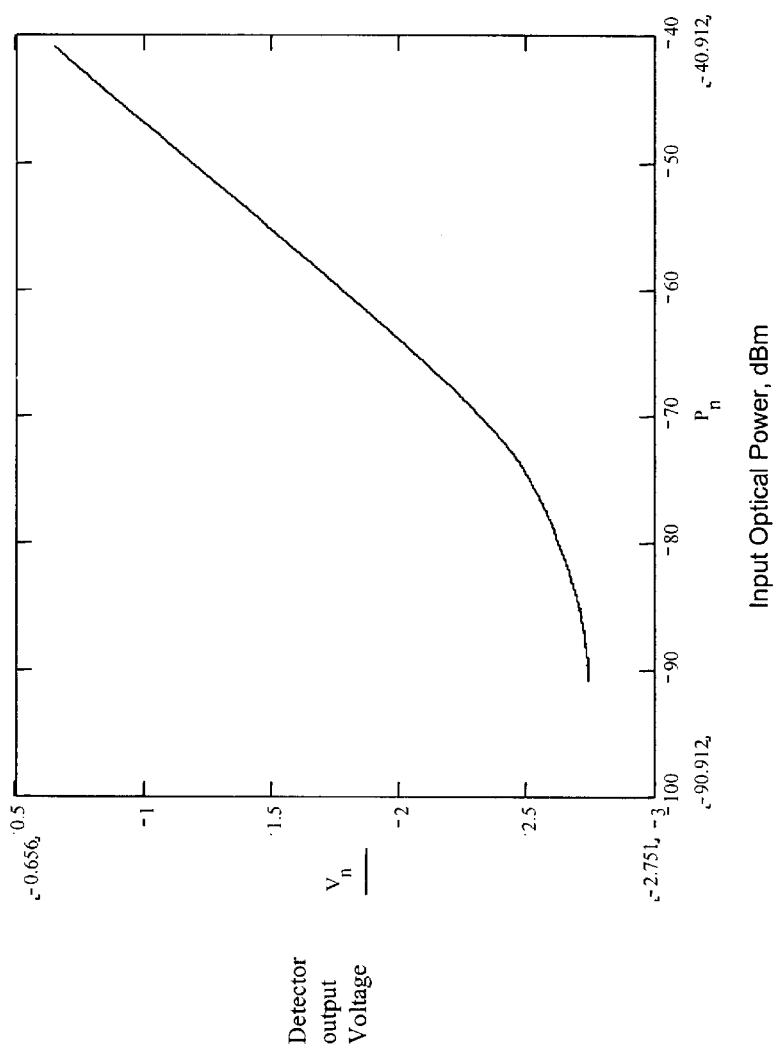
FIG. 3 depicts a transfer function of the logarithmic optical power detector depicted in FIG. 2.

FIG. 3 shows a logarithmic optical power detector transfer function. Significant deviation from log-conformance of the curve can be observed at lower input power levels. This deviation is caused by the addition of the dark current of the photodiode and the leakage current of the circuit to the photo current of the photodiode. The transfer characteristic, though not log-conformant for low optical power levels, is stable and can be characterized and calibrated in subsequent processing to further increase the dynamic range of the measurement system.

It will be recognized that Hermetic sealing of the package may not be required if the circuit is protected from the influence of moisture by polymer sealing.

Figure 4:
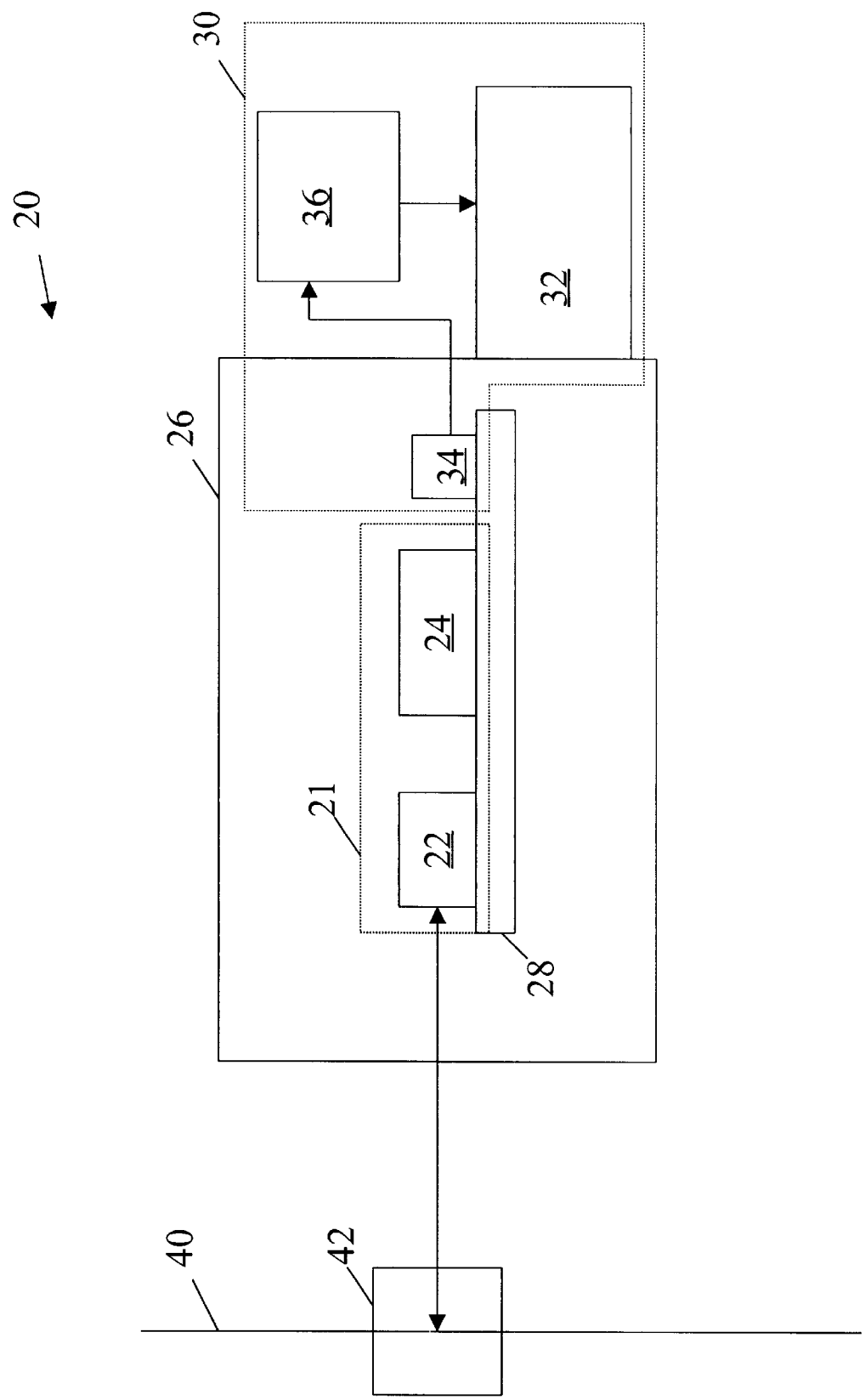
FIG. 4, depicts an alternative embodiment of the present invention wherein the electric cooler is located outside the package.

Referring now to FIG. 4, an alternative embodiment is shown wherein the electric cooler 32 is located outside the package 26. With such a configuration, electric cooler 32 is placed in direct contact with the package such that a constant temperature is maintained by the components therein. Additionally, it will be recognized by one of ordinary skill in the art that any means of maintaining a constant temperature of the photodiode 22 and the logarithmic transimpedance amplifier 24 can be utilized. Accordingly, as long as the temperature is maintained in a constant state, the proposed apparatus is insensitive to the environment transfer characteristic for a wide dynamic signal range.

Figure 5:
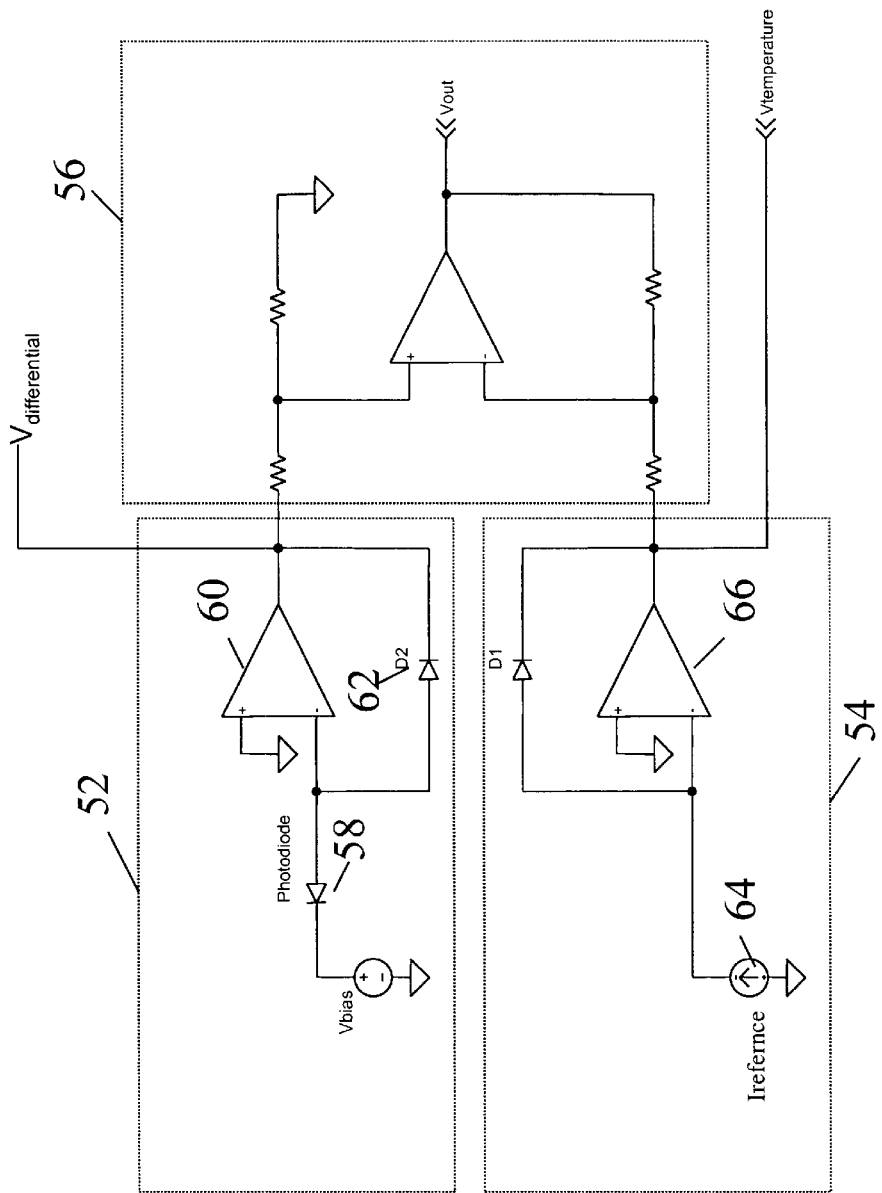
FIG. 5 depicts an implementation of a logarithmic photodetector.

Referring now to FIG. 5, one circuit implementation is shown that depicts a differential logarithmic transimpedance amplifier 50. The logarithmic transimpedance amplifier circuit 50 includes two portions that will be referred to as the photodetection stage 52 and the reference stage 54. The output of each stage is fed into differential stage 56.

Referring first to the photodetection stage 52, the output from a photodetector 58 is fed into a first logarithgmic amplifier comprised of amplifier 60 and P-N junction device 62. The output signal from amplifier 60 is fed to the non-inverting input of differential stage 56. Generally, as the light detected by photodetector 58 is increased, it is logarithmically amplified by amplifier 60 and output to differential stage 56.

The output of reference stage 54, $V_{temperature}$, is described by the following formula where $I_{reference}$ is the reference current input to reference stage 54 and the remaining values were previously described:

$$Vtemperature = \frac{k \cdot T}{q} \cdot \ln\left(\frac{Ireference}{Is}\right).$$

Accordingly, the output voltage of the reference stage 54 is proportional to the temperature of the photodetector package, (i.e. the temperature of the substrate to which the amplifier, photodiode and p-n junction device are attached) and can be used as a temperature feedback signal for the temperature control circuit 36. That voltage, $V_{temperature}$, is fed into the inverting input of the differential stage 56, and subtracted from the voltage ($V_{photodetection}$) generated from the photodetector and amplifier 60, to determine Vout. The resultant output voltage, $V_{out}$, is described by the formula below:

$$Vout = \frac{k \cdot T}{q} \cdot \left(\ln \frac{r \cdot W}{Ireference}\right).$$

As the above formula shows, the transfer function of the circuit 50 is independent from the p-n junction saturation current but still depends on the temperature of the photodetector package. Therefore, although the circuit 50 becomes less temperature dependant, temperature stabilization as described herein is still required.

It should be noted that the amplifier implementation 50 provides a high degree of suppression of electromagnetic pick up noise. To reduce the influence of the input operational amplifiers offset voltages, two matched amplifiers are used in the input and reference circuits. Placing logarithmic p-n junction devices as close together as possible (i.e. two devices on the same die) will further improve the thermal stability of the detector especially if one of these devices is used as a feedback for the temperature stabilization circuit.

It will be recognised that many configurations similar to those described above can be designed using different values, combinations and architectures which will yield the same results as the claimed invention. Thus, while this invention has been particularly shown and described with references to preferred embodiments herein, it is understood by those skilled in the art that various changes in form and details may be made therein without departing from the scope of the invention as defined by the appended claims. It will also be recognized that photodetector circuit similar to described above can be a part of a bigger assembly inside a hermetically sealed temperature stabilized package, where the optical power transformation to an electrical signal will only be a part of the device functionality.

What is claimed is:

1. A wide dynamic range optical power detector, comprising:
- a photodiode for receiving an optical signal;
- a logarithmic transimpedance amplifier, with a p-n junction device as a logarithmic element, coupled to the photodiode; and
- a thermally conductive substrate having said photodiode and logarithmic transimpedance amplifier mounted thereon; and
- a temperature control unit coupled to the thermally conductive substrate to maintain the photodiode at essentially the same constant temperature as the logarithmic transimpedance amplifier during operation of the photodiode and the logarithmic transimpedance amiplifier.

2. A wide dynamic range optical power detector, as described in claim 1, wherein the temperature control unit comprises:
- a thermal electric cooler coupled to said thermally conductive substrate;
- a temperature measurement device, coupled to said thermally conductive substrate; and
- a temperature control circuit, coupled to the temperature measurement device, for receiving temperature measurements of said thermally conductive substrate, and coupled to the thermal electric cooler for sending signals thereto for maintaining said constant temperature.

3. A wide dynamic range optical power detector, as described in claim 2, further comprising:
- an optical coupling from said photodiode to a fiber optic network such that a percentage of light energy from the fiber optic network is received by said photodiode.

4. A wide dynamic range optical power detector, as described in claim 1, wherein said detector is mounted inside a hermetically sealed package.

5. A wide dynamic range optical power detector, as described in claim 1, wherein said detector is mounted inside a polymer scaled package.

6. A wide dynamic range optical power detector, as described in claim 2, wherein said temperature measurement device is a thermistor.

7. A wide dynamic range optical power detector, comprising:
- a means for receiving an optical signal and generating a corresponding electrical signal;
- a means for amplifying the electrical signal, said means for amplifying coupled to the means for receiving; and
- a thermally conductive substrate having said means for receiving and said means for amplifying mounted thereon; and
- a means coupled to the thermally conductive substrate for maintaining the photodiode at essentially the same constant temperature as the logarithmic transimpedance amplifier during operation of the photodiode and the logarithmic transimpedance amplifier.

8. A wide dynamic range optical power detector, as described in claim 7, wherein the means for maintaining comprises:
- a means for cooling and heating, coupled to said thermally conductive substrate;
- a means for temperature measurement, coupled to said thermally conductive substrate; and
- a means for generating a temperature controlling signal, coupled to the means for temperature measurement, for receiving temperature measurements of said thermally conductive substrate, and coupled to the means for cooling and heating for sending signals thereto for maintaining said constant temperature.

9. A wide dynamic range optical power detector, as described in claim 8, further comprising:
- an optical coupling from said means for receiving to a fiber optic network such that a percentage of light energy from the fiber optic network is received by said means for receiving.

10. A wide dynamic range optical power detector, as described in claim 7, wherein said optical power detector is mounted inside a hermetically sealed package.

11. A wide dynamic range optical power detector, as described in claim 7, wherein said optical power detector is mounted inside a polymer scaled package.

12. A wide dynamic range optical power detector, as described in claim 8, wherein said means for temperature measurement is a thermistor.

13. An optoelectronic circuit for performing logarithmic transimpedance amplification of an optical signal, comprising:
- a photodetection stage for detecting the optical signal and for logarithmically amplifying it to generate a photodetection voltage;
- a reference stage for generating a reference voltage that is proportional to the environmental temperature of the circuit;
- a differential stage, coupled to said photodetection stage and said reference stage, for generating the logarithmic transimpedance amplified signal by determining the difference between the photodetection voltage and the reference voltage;
- wherein said photodetection stage comprises:
  - a photodetector for receiving the optical signal and converting that signal into a corresponding voltage signal; and
  - a first amplifier, for receiving the voltage signal from the photodetector, said first amplifier having a first p-n junction device coupled in the feedback path to provide logarithmic amplification, the output of said first amplifier being a photodetection voltage signal, said photodetector and said p-n junction device coupled to a common thermally conductive substrate that is maintained at a constant temperature by a temperature control unit so that the temperature at the photodiode is essentially at the same constant temperature as the first amplifier when the photodiode and first amplifier are operating.

14. An optoelectronic circuit, as described in claim 13, wherein said reference stage comprises:
- a current reference device for generating a predetermined current signal; and
- a second amplifier, for receiving the current signal from the current reference device, said second amplifier having a second p-n junction device coupled in the feedback path, the output of said second amplifier being a reference voltage signal.

15. An optoelectronic circuit, as described in claim 13, wherein said differential stage comprises:
- a differential amplifier, coupled to the photodetection stage and to the reference stage for generating an output voltage signal that corresponds to the difference between the photodetection voltage signal and the reference voltage signal.

16. An optoelectronic circuit, as described in claim 14, wherein said first p-n junction device and said second p-n junction device are disposed on a common die to improve the thermal stability of the circuit.

17. An optoelectronic circuit, as described in claim 14, wherein said reference stage generates an output signal, Vtemperature, described by the following formula where $I_{reference}$ is a reference current generated by said reference current device, k is Boltzmann's constant, q is Electron charge, T is absolute temperature of the second p-n junction device in Kelvin, r is the responsivity of the photodetector, $I_s$ is the reverse saturation current of the second p-n junction device:

$$Vtemperature = \frac{k \cdot T}{q} \cdot \ln\left(\frac{Ireference}{Is}\right).$$

18. An optoelectronic circuit, as described in claim 14, wherein said differential stage generates an output signal, Vout, described by the following formula where $I_{reference}$ is a reference current generated by said reference current device, k is Boltzmann's constant, q is Electron charge, T is absolute temperature of the second p-n junction device in Kelvin, r is the responsivity of the photodetector, W is the power of the optical signal $$Vout = \frac{k \cdot T}{q} \cdot \left(\ln\frac{r \cdot W}{Ireference}\right).$$

* * * * *